(12) United States Patent
Huang et al.

(10) Patent No.: US 7,697,071 B2
(45) Date of Patent: Apr. 13, 2010

(54) DEVICE AND METHOD FOR DETECTING DISPLAY MODE OF VIDEO SIGNAL

(75) Inventors: Chao-Chih Huang, Tai-Chung Hsien (TW); Po-Wei Chao, Taipei Hsien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1078 days.

(21) Appl. No.: 11/307,960

(22) Filed: Mar. 1, 2006

(65) Prior Publication Data

US 2006/0197833 A1 Sep. 7, 2006

(30) Foreign Application Priority Data

Mar. 2, 2005 (TW) .............................. 94106265 A

(51) Int. Cl.
*H04N 5/46* (2006.01)
*H04N 3/27* (2006.01)
*H04N 5/253* (2006.01)

(52) U.S. Cl. .................... 348/558; 348/449; 348/97; 348/459; 348/448; 348/700; 348/555

(58) Field of Classification Search ................ 348/449, 348/97, 554, 555, 558, 459, 911, 448, 452, 348/451, 700, 701, 180

See application file for complete search history.

(56) References Cited

U.S. PATENT DOCUMENTS

| 6,340,990 | B1 | 1/2002 | Wilson | |
|---|---|---|---|---|
| 6,449,015 | B1* | 9/2002 | Sugaya | 348/459 |
| 6,563,550 | B1 | 5/2003 | Kahn et al. | |
| 6,965,414 | B2* | 11/2005 | Haraguchi | 348/441 |

* cited by examiner

*Primary Examiner*—M. Lee
*Assistant Examiner*—Jean W Désir
(74) *Attorney, Agent, or Firm*—Thomas, Kayden, Horstemeyer & Risley

(57) ABSTRACT

A device for detecting a display mode of a video signal having first pixels corresponding to a first field, second pixels corresponding to a second field, and third pixels corresponding to a third field, includes a pixel converter, a measurement circuit, and a decision circuit. The pixel converter converts the second pixels to generate converted pixels. The measurement circuit generates measurement values related to differences between a converted pixel, a first pixel, and a third pixel. The decision circuit determines the display mode of the video signal according to the first, second, and third measurement values.

16 Claims, 4 Drawing Sheets

DEVICE AND METHOD FOR DETECTING DISPLAY MODE OF VIDEO SIGNAL

BACKGROUND OF THE INVENTION

1. Field of the Invention

The present invention relates to Telecine processing, and more particularly, to devices and methods for detecting a display mode of a video signal.

2. Description of the Prior Art

A movie is typically captured and played at a speed of twenty-four frames per second. If there is a requirement that the movie must be played by a video playback device such as a television (TV) or a digital versatile disc (DVD) player, Telecine processing can be utilized for converting image data of the movie into that complying with NTSC or PAL specifications.

The Telecine processing mentioned above is typically classified to be one of various kinds of processing types such as still scene processing, 3:2 pull-down processing, 2:3 pull-down processing, and 2:2 pull-down processing. Please refer to FIG. 1. FIG. 1 is a diagram illustrating the 3:2 pull-down processing according to the prior art, where three fields 121-1, 121-2, and 122-1 correspond to a frame 111, two fields 122-2 and 123-1 correspond to a frame 112, three fields 123-2, 124-1, and 124-2 correspond to a frame 113, and two fields 125-1 and 125-2 correspond to a frame 114. In addition, after utilizing the 2:2 pull-down processing shown in FIG. 2, two fields 221-1 and 221-2 correspond to a frame 211, two fields 222-1 and 222-2 correspond to a frame 212, two fields 223-1 and 223-2 correspond to a frame 213, and two fields 224-1 and 224-2 correspond to a frame 214.

However, if the video playback device has not correctly detected whether the image data to be played is generated by utilizing the Telecine processing or which kind of processing type has been utilized for generating the image data, when the video playback device attempts to recovery the frames to play the movie utilizing a progressive scan method, erroneous images would be generated.

SUMMARY OF THE INVENTION

It is an objective of the claimed invention to provide devices and methods for detecting a display mode of a video signal.

According to one embodiment of the claimed invention, a device for detecting a display mode of a video signal having a plurality of first pixels corresponding to a first field, a plurality of second pixels corresponding to a second field, and a plurality of third pixels corresponding to a third field is disclosed. The device comprises: a converter for converting the plurality of second pixels into a plurality of converted pixels of a converted field, the second pixels and the converted pixels respectively belonging to different scan lines; a measurement circuit, coupled to the converter, for generating a first, a second, and a third values according to differences between the converted pixel, the first pixel, and the third pixel; and a decision circuit, coupled to the measurement circuit, for determining the display mode according to the first, second, and third values.

According to one embodiment of the claimed invention, a method for detecting a display mode of a video signal having a plurality of first pixels corresponding to a first field, a plurality of second pixels corresponding to a second field, and a plurality of third pixels corresponding to a third field is disclosed. The method comprises: converting the plurality of second pixels to a plurality of converted pixels of a converted field, the second pixels and the converted pixels respectively belonging to different scan lines; generating a first value, a second value, and a third value according to differences between the converted pixel, the first pixel, and the third pixel; and determining the display mode according to the first, second, and third values.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
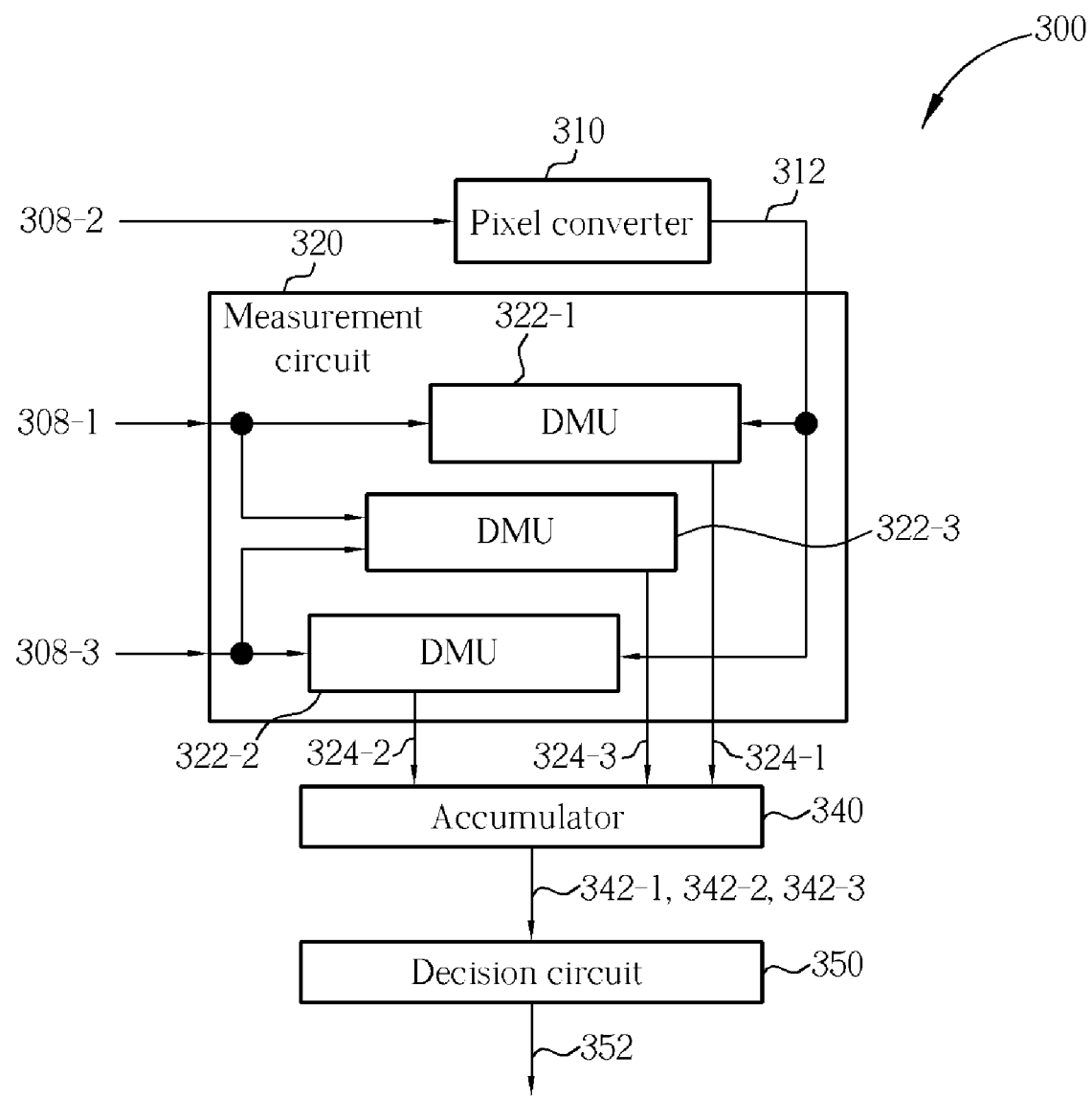
FIG. 3 is a diagram of a device according to first embodiment of the present invention.

FIG. 3 is a diagram of a device 300 according to a first embodiment of the present invention, where the video signal carries the movie's image data such as fields Fd(T−1), Fd(T), and Fd(T+1). The device 300 is capable of detecting whether the image data carried by the video signal is generated by utilizing the Telecine processing mentioned above. In addition, the device 300 is capable of detecting which kind of Telecine processing has been utilized for generating the image data, for example, the still scene processing, the 3:2 pull-down processing, the 2:3 pull-down processing, and the 2:2 pull-down processing, in order to properly select a corresponding mode as the display mode for the video signal. The display mode of the video signal represents a method of selection for the fields that are needed in a de-interlacing calculation, where operations of the de-interlacing calculation and/or the method of selection for the fields mentioned above corresponds to video characteristics detected by the device 300. Regarding a specific field at a current time point, as long as another field at another time point before or after the current time point is found for matching the specific field, original images of the movie can be perfectly recovered.

In an embodiment, the device 300 is utilized for detecting pixels 308-1, pixels 308-2, and pixels 308-3 of the video signal to detect the display mode of the video signal. The pixels 308-1, the pixels 308-2, and the pixels 308-3 respectively correspond to the fields Fd(T−1), Fd(T), and Fd(T+1) sequentially carried by the video signal. By the decision decided by the device 300 for the display mode of the video signal, a later stage of the device 300, e.g., a de-interlacing circuit, may attempt to re-combine or alter the fields. As a result, the later stage may recover the original images of the movie or generate new images that are similar to the original images, so a video playback device comprising the device 300 may correctly play the video signal utilizing a progressive scan method.

In one embodiment, the device 300 comprises a pixel converter 310, a measurement circuit 320, and a decision circuit 350. The pixel converter 310 (which can be simply referred to as the converter 310 in the present invention) converts the pixels 308-2 to a plurality of converted pixels 312 of a converted field Fd'(T). If the field Fd(T) is an odd field, the converted field Fd'(T) simulates to be an even field. That is, the converted field Fd'(T) simulates the image of lacked scan lines of the field Fd(T), i.e., the pixels 308-2 and the converted pixels 312 respectively belong to different scan lines. The converter 310 has many implementation methods. For example, the converter 310 may perform a motion adaptive de-interlacing operation on the pixels 308-2 to generate the converted pixels 312. In addition, the converter 310 may perform an average operation on pixels of two adjacent rows in the image of the field Fd(T) to generate pixels of a corresponding row in the image of the converted field Fd'(T). According to a simplest implementation choice, the pixels 308-2 are copied as the converted pixels 312.

The measurement circuit 320 performs difference measurement according to the previous field Fd(T−1), the next field Fd(T+1), and the converted field Fd'(T), in order to generate first values 324-1, second values 324-2, and third values 324-3, where the first values 324-1, the second values 324-2, and the third values 324-3 are measurement values related to differences between the pixels 308-1, the pixels 312, and the pixels 308-3. In one embodiment shown in FIG. 3, the measurement circuit 320 comprises three difference measurement units (DMUs) 322-1, 322-2, and 322-3 for calculating differences between the pixels 308-1, the pixels 312, and the pixels 308-3. In another embodiment of the present invention, only a portion of pixels of each field is used in the measurement process.

In addition, different implementation methods can be applied to the measurement circuit 320. For example, the DMU 322-1 measures absolute values of the differences between the converted pixels 312 and the pixels 308-1 as the measurement values 324-1, where the DMUs 322-2 and 322-3 are substantially similar to the DMU 322-1. In another example, the DMU 322-1 measures square values of the differences between the converted pixels 312 and the pixels 308-1 as the measurement values 324-1, where the DMUs 322-2 and 322-3 are substantially similar to the DMU 322-1. As a result, the decision circuit 350 determines the display mode of the video signal according to the measurement values.

According to the embodiment shown in FIG. 3, the device 300 comprises an accumulator 340 for respectively accumulating the measurement values 324-1, 324-2, and 324-3 to generate an accumulation value 342-1, an accumulation value 342-2, and an accumulation value 342-3. As the accumulation values 342-1, 342-2, and 342-3 correspond to differences between the fields, the decision circuit 350 determines the display mode of the video signal according to the accumulation values 342-1, 342-2, and 342-3.

Figure 1:
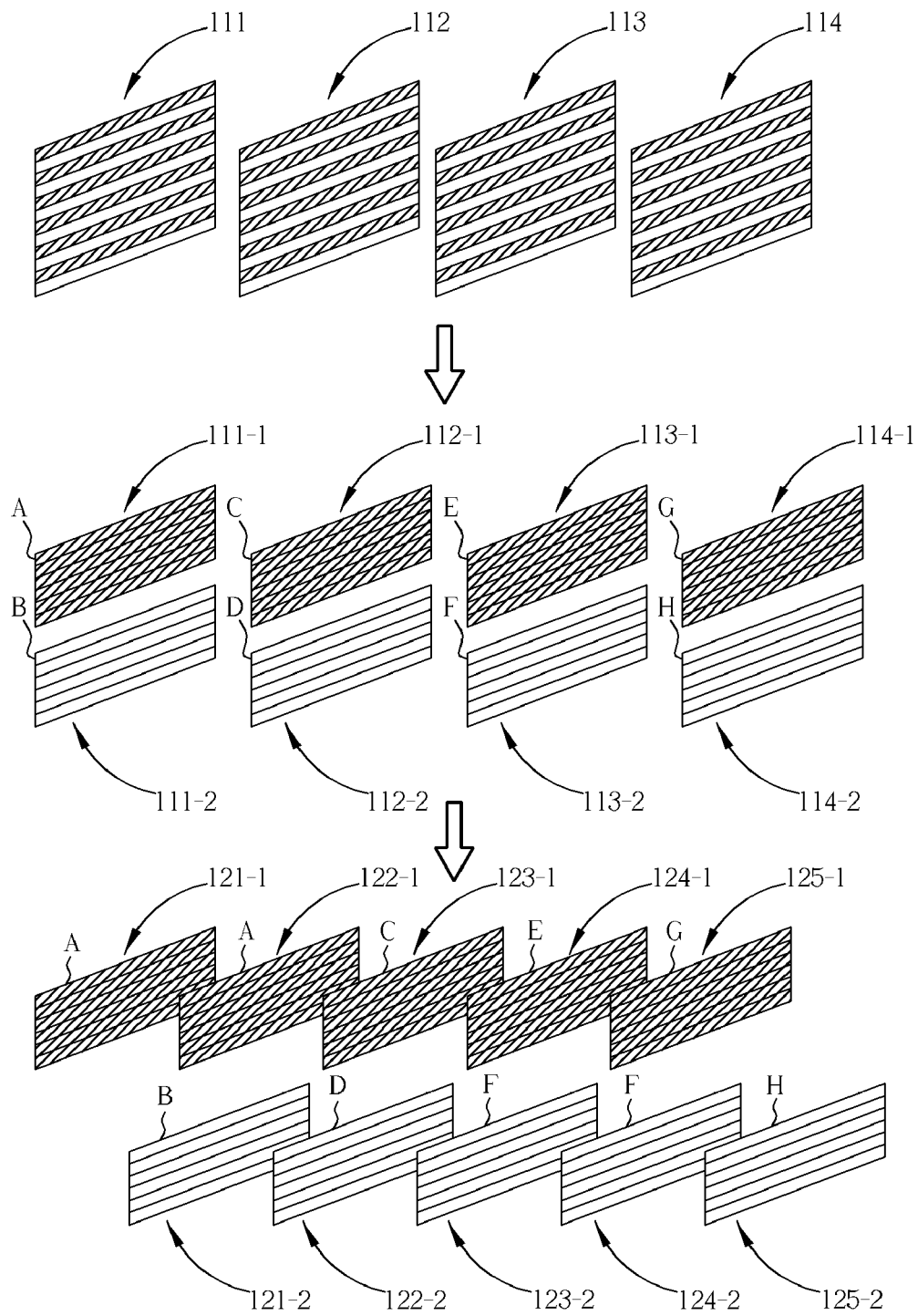
FIG. 1 is a diagram illustrating 3:2 pull-down processing according to the prior art.

For example, the decision circuit 350 determines whether the video signal is generated by utilizing the 3:2 pull-down processing shown in FIG. 1 according to variations of the accumulation value 342-3 respect to time. For example, if a sequence of the magnitude of the accumulation value 342-3 with respect to time is {L, H, H, H, H, L, H, H, H, H, . . . } with L and H respectively representing smaller magnitude and larger magnitude, L corresponds to smaller differences such as the difference between the fields 121-1 and 122-1 shown in FIG. 1, and H corresponds to larger differences such as the differences between the odd fields 122-1 to 125-1 shown in FIG. 1 and the difference between the field 125-1 and the next odd field thereof. In this situation, the decision circuit 350 determines that the video signal is generated by utilizing the 3:2 pull-down processing shown in FIG. 1, so the decision circuit 350 determines that the video playback device should perform the de-interlacing operation corresponding to the 3:2 pull-down processing.

Figure 2:
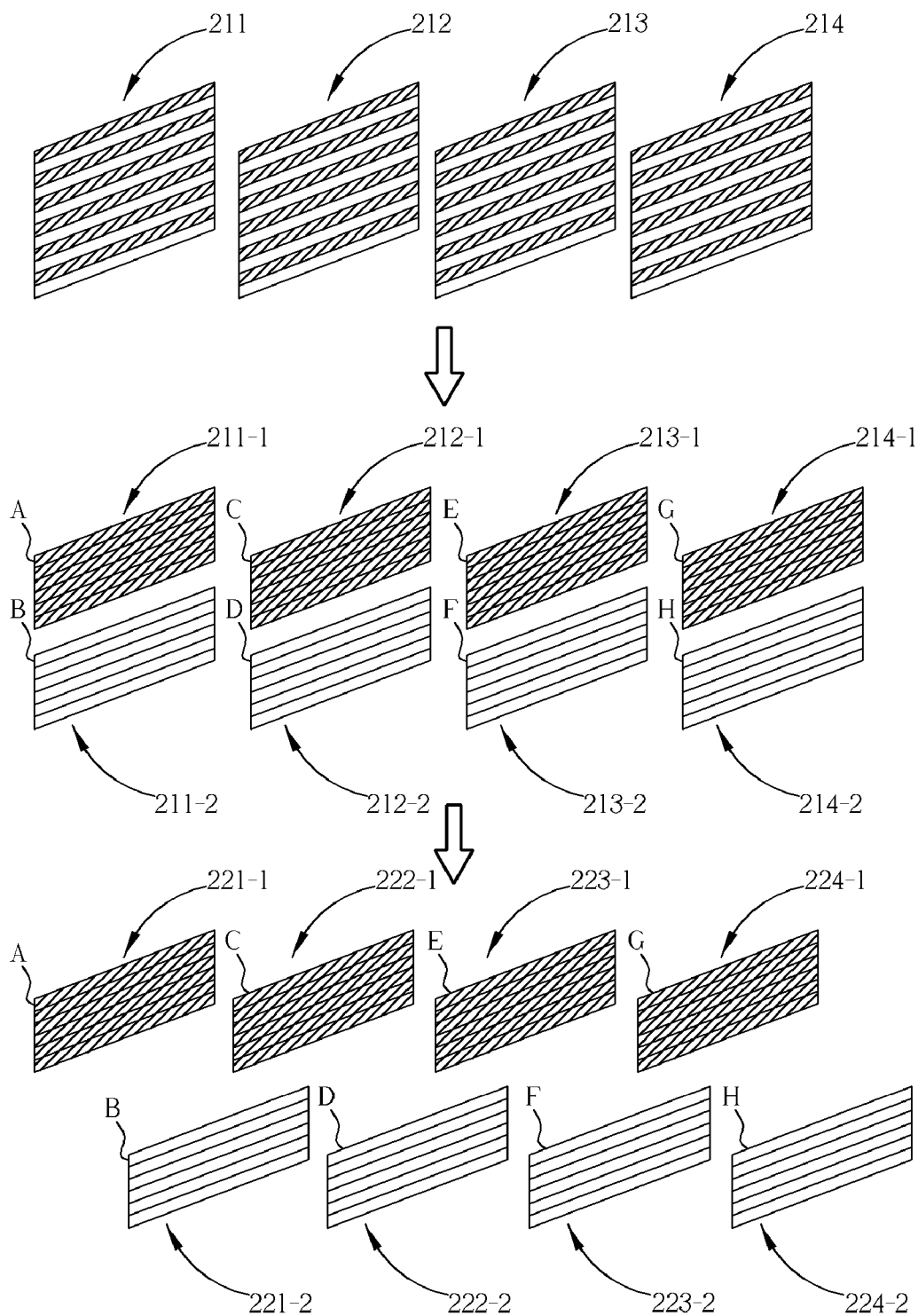
FIG. 2 is a diagram illustrating 2:2 pull-down processing according to the prior art.

For example, the decision circuit 350 determines whether the video signal is generated by utilizing the 2:2 pull-down processing shown in FIG. 2 according to statistical data of the difference between the accumulation values 342-1 and 342-2, e.g., a sequence representing which of the two accumulation values 342-1 and 342-2 is larger with respect to time, or according to statistical data of variations of the accumulation values 342-1 and 342-2 with respect to time. For example, a sequence of the magnitude of the accumulation value 342-1 or the accumulation value 342-2 with respect to time is {L, H, L, H, L, H, . . . }, where L corresponds to smaller differences such as the difference between the fields 221-1 and 221-2 derived from the same frame 221 as shown in FIG. 2, and H corresponds to larger differences such as the differences between the fields derived from different frames, e.g., the fields 221-2 and 222-1 shown in FIG. 2. In this situation, the decision circuit 350 determines that the video signal is generated by utilizing the 2:2 pull-down processing shown in FIG. 2.

If the video signal is generated by utilizing the still scene processing, a sequence of the magnitude of the accumulation values 342-1 and/or 342-2 with respect to time would be something like: {M+, M−, M+, M−, M+, M−, . . . }, where M+ and M− respectively represent slightly larger magnitude and slightly smaller magnitude around the mean M thereof. In this situation, the accumulation value(s) can be considered stable. As a result, the decision circuit 350 determines that the video signal is generated by utilizing the still scene processing, and determines the display mode of the video signal accordingly.

The decision circuit 350 mentioned above may compare various decisions that have been made, e.g., the decisions related to which kind of Telecine processing was utilized for generating the video signal, to prevent erroneously deciding the display mode of the video signal. An implementation method is providing a predetermined order of utilizing the decisions mentioned above, i.e., the decisions are involved with weighted significance, and making the final decision according to the decisions together with the weighted significance thereof. In addition, if the decision circuit 350 determines that the video signal is not generated by any kind of Telecine processing (e.g., the still scene processing, the 3:2 pull-down processing, or the 2:2 pull-down processing), the decision circuit 350 determines that the video signal is not derived from a movie. In this situation, the decision circuit 350 determines that the video playback device should display the video signal by utilizing a predetermined display mode for processing a normal program.

Figure 4:
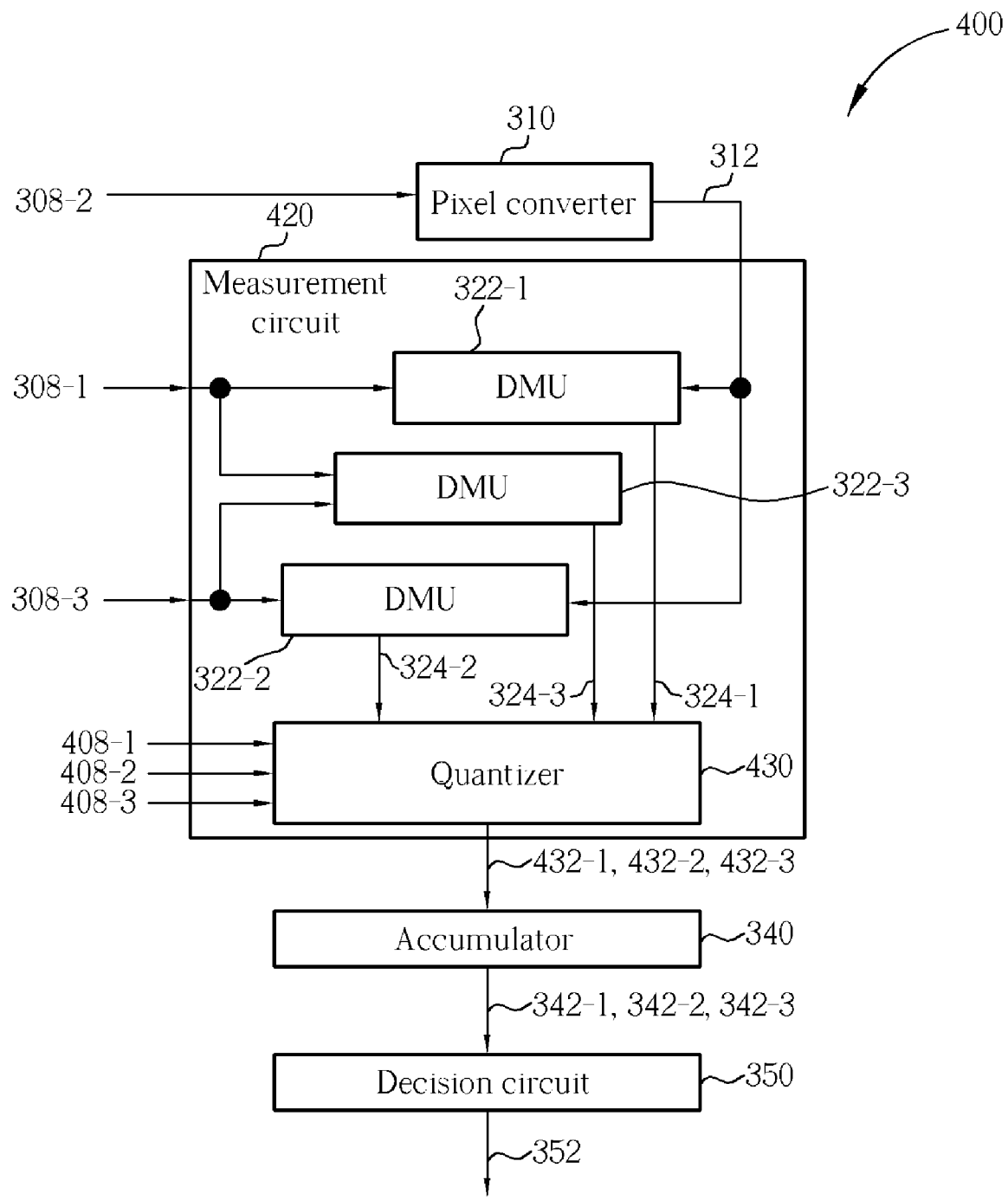
FIG. 4 is a diagram of a device according to second embodiment of the present invention.

FIG. 4 is a diagram of a device 400 according to a second embodiment of the present invention. In addition to the DMUs 322-1, 322-2, and 322-3 mentioned above, the measurement circuit 420 further comprises a quantizer 430 in order to suppress possible interference due to noises. The quantizer 430 respectively quantizes the measurement values 324-1, 324-2, and 324-3 to generate quantization results 432-1, 432-2, and 432-3. In this embodiment, the difference quantizer 430 determines one of the quantization results 432-1 to be a first quantization value or a second quantization value according to whether one of the measurement values 324-1 reaches a threshold value 408-1. In this embodiment, the first and second quantization values are respectively equal to one and zero. The operation principles of the quantizer 430 is well known in the art, and therefore not explained in detail here. In a simplified embodiment, the threshold values 408-1, 408-2, and 408-3 are equal to each other.

The device 300 or the device 400 of the present invention makes the decisions mentioned above in real time when the Telecine-processed status appears or disappears. As a result, the video playback device is capable of correctly performing the de-interlacing operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for detecting a display mode of a video signal having a plurality of first pixels corresponding to a first field, a plurality of second pixels corresponding to a second field, and a plurality of third pixels corresponding to a third field, the device comprising:
   a converter for converting the plurality of second pixels into a plurality of converted pixels of a converted field, the second pixels and the converted pixels respectively belonging to different scan lines;
   a measurement circuit, coupled to the converter, for generating a first, a second, and a third values according to differences between the converted pixel, the first pixel, and the third pixel; and
   a decision circuit, coupled to the measurement circuit, for determining the display mode according to the first, second, and third values, the decision circuit comprising an accumulator for respectively accumulating the first, second, and third values to generate a first, a second, and a third accumulation values;
   wherein the display mode is determined according to at least one of variations of the first, the second and the third accumulation values.

2. The device of claim 1, wherein the display mode is determined according to variation of the third accumulation value and according to a difference between the first and second accumulation values.

3. The device of claim 1, wherein the measurement circuit comprises:
   a quantizer for respectively quantizing the first, the second, and the third values.

4. The device of claim 1, wherein the measurement circuit comprises:
   a first measurement unit for generating the first value according to the converted pixel and the first pixel;
   a second measurement unit for generating the second value according to the converted pixel and the third pixel; and
   a third measurement unit for generating the third value according to the first and third pixels.

5. The device of claim 1, wherein the first value is an absolute value of the difference between the converted pixel and the first pixel.

6. The device of claim 1, wherein the first value a square value of the difference between the converted pixel and the first pixel.

7. The device of claim 1, wherein when the second field is one of an odd field and an even field, the converted field is the other one of the odd and the even fields.

8. The device of claim 1, wherein the converter comprises a de-interlacing circuit.

9. A method for detecting a display mode of a video signal having a plurality of first pixels corresponding to a first field, a plurality of second pixels corresponding to a second field, and a plurality of third pixels corresponding to a third field, the method comprising:
   converting the plurality of second pixels to a plurality of converted pixels of a converted field, the second pixels and the converted pixels respectively belonging to different scan lines;
   generating a first value, a second value, and a third value according to differences between the converted pixel, the first pixel, and the third pixel; and
   determining the display mode according to the first, second, and third values, the determining step comprising:
      respectively accumulating the first, second, and third values to generate a first, a second, and a third accumulation values; and
      determining the display mode according to the first, the second, and the third accumulation values;
      wherein the display mode is determined according to at least one of variations of the first, the second, the third accumulation values.

10. The method of claim 9, wherein the display mode is determined according to variations of the third accumulation value and according to a difference between the first and second accumulation values.

11. The method of claim 9, wherein the measuring step comprises:
   respectively quantizing the first, second, and third values.

12. The method of claim 9, wherein the measuring step comprises:
   generating the first value according to the converted and the first pixels;
   generating the second value according to the converted and the third pixels; and
   generating the third value according to the first and third pixels.

13. The method of claim 12, wherein the first value is an absolute value of the difference between the converted and the first pixels.

14. The method of claim 12, wherein the first value is a square value of the difference between the converted and the first pixels.

15. The method of claim 9, wherein when the second field is one of an odd field and an even field, the converted field is the other one of the odd and the even fields.

16. The method of claim 9, wherein the display mode is determined according to at least one of variations of the first, the second, the third values.

* * * * *